W. A. FLANDERS.
Bee-Moth Exterminator.
No. 11,013.
Patented June 6, 1854.
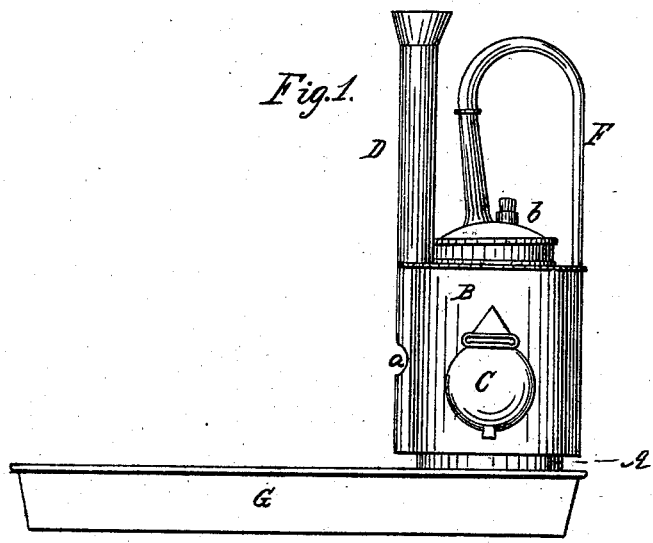
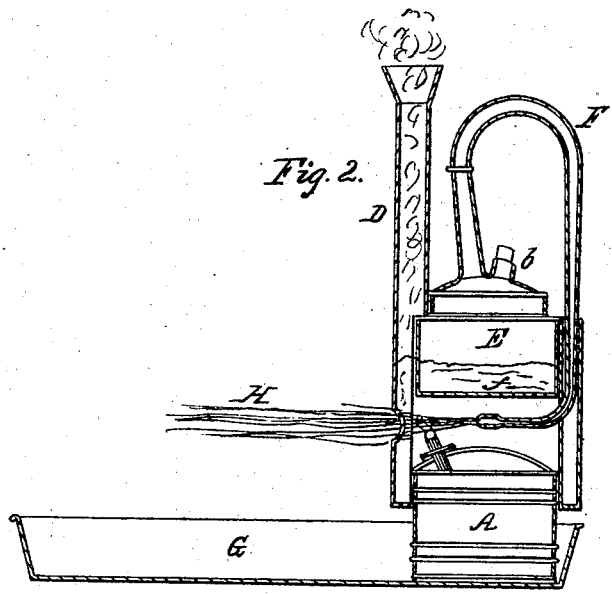
Witnesses:
John A. S. White
L. A. Sargent
Inventor:
W. A. Flanders

UNITED STATES PATENT OFFICE.

W. A. FLANDERS, OF SHARON, VERMONT.

MOTH-KILLER.

Specification of Letters Patent No. 11,013, dated June 6, 1854.

*To all whom it may concern:*

Be it known that I, W. A. FLANDERS, of Sharon, in the county of Windsor and State of Vermont, have invented a new and useful Instrument for Destroying Moths which Infest Beehives; and I hereby declare the following to be a full, clear, and exact description of the same, reference being had to the annexed drawings, making part of this specification, in which:

Figure 1 is a front view of the apparatus employed by me; Fig. 2, a vertical section through the same, showing the manner in which it operates.

Various attempts have been made to prevent the ravages of the destructive insect known as the bee moth, by which entire apiaries are often destroyed, as well as all the pleasure and profit of an important branch of rural economy. This insect on account of its diminutive size is enabled to pass through any opening that will admit the bee, and consequently most of the so-called "moth traps" have failed to produce any good result, as no method has been devised by which it can be excluded from the hives. Advantage has however been taken of the fact that the moth is most active at night while the bees are quiet within the hives, and attempts have been made to destroy them by placing lamps and candles near the hives or within the bee house. This plan though partially effective was liable to so many objections that it has been entirely abandoned. In the first place the flame produced by a single lamp was very small and the millers have often been observed after being partially crippled by flying through the flame to creep into the hive, where they doubtless were in condition to lay their eggs and do all the mischief of which they were at any time capable. A second objection to a lamp so arranged is that the wick is entirely exposed and the millers falling upon it greatly obscure and weaken the flame, if they do not absolutely extinguish it, which latter also often takes place; thirdly, there has heretofore been no method known by which the flame could be protected from the wind, for if it were covered by either a glass or gauze lantern, it would be useless for the purpose of destroying the miller and in consequence it could only be used in perfectly calm weather and should the wind rise while it was in use, it was liable either to be extinguished, or to have the cinder which accumulates upon the wick, blown about the apiary and thus the latter was in danger of being more quickly though perhaps not more surely, destroyed than if the miller were allowed free access. These objections have rendered the simple lamp nearly useless for the purpose; I have however succeeded by my present invention in entirely removing them and in producing a lamp, in which, 1st the wick is protected from the wind and cannot be thereby extinguished; 2d, the millers cannot fall upon the wick and extinguish or obscure the flame; 3d, a flame is produced which is many times larger and brighter than can possibly be obtained from any ordinary lamp; 4th, the flame is thrown into a horizontal position so that a pan of liquid may be placed immediately beneath it, to catch and drown the insects be they ever so slightly disabled by the flame.

It is well known that bees are attracted from a great distance by the smell of burning wax, the fact being taken advantage of by the bee hunter upon the prairies, in a manner familiar to all; in the same manner, the moth is attracted to the hive, by the odor of the wax; the older the hive and the stronger the scent of its combs the more attractive it is to the moth. This insect, like the bee is also allured by the scent of burning wax and I accordingly increase the efficiency of my moth killer by producing at the time that it is in operation, an odor of burning wax by which the moth is attracted from every part of the apiary whether it be covered or not.

My invention consists in the use of a lamp which is surrounded by a lantern to protect it from the wind, and from being extinguished by the dead millers as before mentioned, the flame of the lamp being blown through an opening through the side of the lantern by a jet of the vapor of alcohol, produced from a reservoir or boiler above the lamp, arranged in a manner somewhat similar to an ordinary blow-pipe in which the flame is urged by similar means.

To enable others skilled in the art to make and use my invention I will proceed to describe the manner which I have adopted of carrying it out.

A is the lamp which may be made of the form seen in the drawings and fed with alcohol in which bees wax or old honey comb has been dissolved, or it may take the form of the old open iron lamp, in which case the waste wax and old comb may be made use of alone or in combination with tallow, the object being to produce a scent of burning wax, which as before stated is for the purpose of alluring the moth to the flame. Immediately over the lamp is placed the lantern B which is furnished with the door C and chimney D. In the upper part of the lantern is placed the boiler E. This boiler is furnished with a pipe F so bent as seen in Fig. 2 that it shall approach very near to the flame of the lamp, and terminating with a very small aperture similar to that in the end of a common blow pipe. Upon a level with the wick a hole $a$ is made through one side of the lantern to permit the passage of the flame as will be hereafter explained.

$b$ is an opening closed by a suitable stopper through which the "boiler" E is replenished.

G is a pan of liquid in which, or by the side of which the lamp is placed.

Operation: The lamp being replenished with some mixture of wax as before stated, the boiler E is partially filled with alcohol as seen at $f$ in Fig. 2 and the lamp is lighted; the flame striking against the bottom of the boiler, soon vaporizes the alcohol which issues from the tube F with considerable force and urges and increases the flame of the lamp, blowing it through the opening $a$ in a broad bright flame of from 8 to 10 inches in length as seen at H in Fig. 2. The millers attracted by the burning wax, and also by the light fly into the flame and be they ever so little injured, fall into the pan of liquid beneath and are instantly drowned. It will be perceived that the light given out by so large a flame will far exceed that of any ordinary lamp, while the size of the flame and the force with which it issues from the lantern will make it far more effective to destroy or disable the millers should they come near to it, and also that the lamp is entirely protected from being extinguished either by the wind or by the millers falling upon the wick.

I do not claim to have invented a blow pipe in which the flame of a lamp is urged by a stream of alcoholic vapor, generated by the heat of the lamp itself as this forms no part of my invention, but What I do claim as my invention and desire to secure by Letters Patent is—

The within described moth killer constructed and operating in the manner substantially as set forth, the lamp being entirely protected from the wind and from being extinguished by the dead millers, and the flame blown through an opening in the side of the lantern as explained.

W. A. FLANDERS.

Witnesses:
 JOHN A. S. WHITE,
 L. A. SARGENT.